UNITED STATES PATENT OFFICE.

HENRY BUTTERMANN, JR., AND GARRY G. BUTTERMANN, OF LOUISVILLE, KENTUCKY.

HEAT-INSULATING MATERIAL.

1,264,009.      Specification of Letters Patent.     Patented Apr. 23, 1918.

No Drawing.     Application filed September 26, 1917. Serial No. 193,381.

*To all whom it may concern:*

Be it known that we, HENRY BUTTERMANN, Jr., and GARRY G. BUTTERMANN, citizens of the United States, residing at Louisville, in the county of Jefferson and State of Kentucky, have invented certain new and useful Improvements in Heat-Insulating Materials; and we do hereby declare the following to be a full, clear, and exact description of the invention, such as will enable others skilled in the art to which it appertains to make and use the same.

Our invention relates to improvements in heat insulating material, and it consists of a composition of matter composed of coal dust, sand, Portland cement, gypsum and blue clay, together with a sufficient supply of water to set the same.

According to our invention we take about 40% by measure of coal dust, 25% by measure of sand, 15% by measure of Portland cement, 10% by measure of powdered gypsum, and 10% by measure of blue clay. This latter is mixed with sufficient water to form a thin solution and is then added to the other ingredients, and the whole mass is thoroughly mixed and is poured into suitable molds and allowed to set, and is then dried to form slabs which may be of any size or thickness, and may be used to line the walls of cold storage plants.

Instead of manufacturing the same in slabs, the composition, while still in the plastic state, may be poured or rammed to form the lining of a hollow refrigerator, ice cream freezer, or the like, where it is allowed to set and becomes more or less dry.

We have found the composition of matter especially efficient as a filler between the walls of ice boxes and ice cream cabinets, or refrigerators, where it is desired to retain the contents of the package in a cold or refrigerated condition.

The proportions of the ingredients may be somewhat varied if desired.

Having thus described our invention what we claim and desire to secure by Letters Patent of the United States is:

1. A heat insulating material composed of coal dust, sand, Portland cement, gypsum, blue clay and water, substantially as described.

2. A heat insulating material consisting of the following materials in substantially the proportions by measure herein stated—coal dust 40%, sand 25%, Portland cement 15%, gypsum 10% and blue clay 10%, mixed with sufficient water to cause the material to set, substantially as described.

In testimony whereof, we affix our signatures.

HENRY BUTTERMANN, JR.
GARRY G. BUTTERMANN.

Copies of this patent may be obtained for five cents each, by addressing the "Commissioner of Patents, Washington, D. C."